United States Patent [19]

Brax

[11] 4,097,259
[45] Jun. 27, 1978

[54] FEEDER CONDUITS FOR A GLASS FURNACE WITH HEATING ELECTRODES

[75] Inventor: Jean Albert Brax, Chalon sur Saone, France

[73] Assignee: Saint Gobain Industries, Neuilly-sur-Seine, France

[21] Appl. No.: 833,956

[22] Filed: Sep. 16, 1977

[30] Foreign Application Priority Data

Oct. 29, 1976 France .................. 76 32789

[51] Int. Cl.² ............................................. C03B 5/02
[52] U.S. Cl. ...................................... 65/327; 65/136; 65/335; 65/347; 13/6
[58] Field of Search .............. 65/134, 136, 335, 327, 65/347, DIG. 4, 326; 13/6

[56] References Cited

U.S. PATENT DOCUMENTS

| 2,654,184 | 10/1953 | Peiler | 65/326 X |
| 3,145,246 | 8/1964 | Augsburger | 65/327 X |
| 3,160,492 | 12/1964 | Chapman et al. | 65/326 X |
| 3,326,655 | 6/1967 | Penberthy | 13/6 X |

Primary Examiner—Arthur D. Kellogg
Attorney, Agent, or Firm—Pennie & Edmonds

[57] ABSTRACT

A feeder conduit is disclosed for conveying molten glass from a forehearth of a glass furnace to a glass forming machine. The feeder conduit includes an elongated conduit which receives molten glass from the forehearth and delivers the molten glass to an inlet of a bowl-shaped container. The container has an orifice in its bottom for withdrawing the molten glass therefrom and a vertical cylinder disposed within the container and above the orifice. The cylinder and side wall of the container opposite the inlet of the container define a semi-annular channel therebetween and a first electrode is inserted in the molten glass upstream of said cylinder and a second electrode is inserted in the molten glass within the semi-annular channel. The first and second electrodes are offset from the centerline of the feeder conduit. As the molten glass flows through the inlet in the container, around the cylinder and through the semi-annular channel, an electric current passes between the electrodes to heat the molten glass.

20 Claims, 5 Drawing Figures

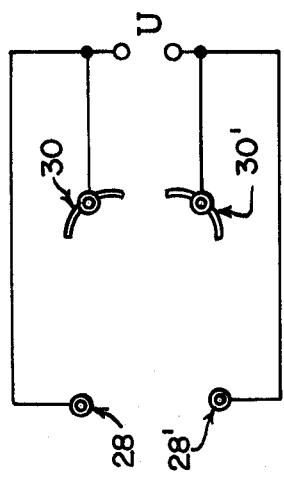
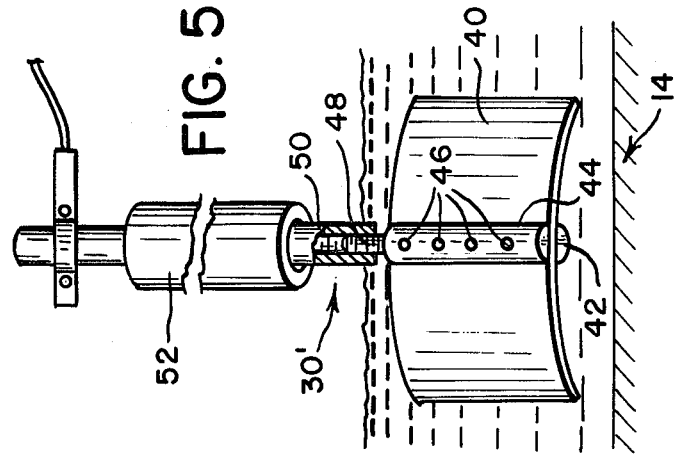
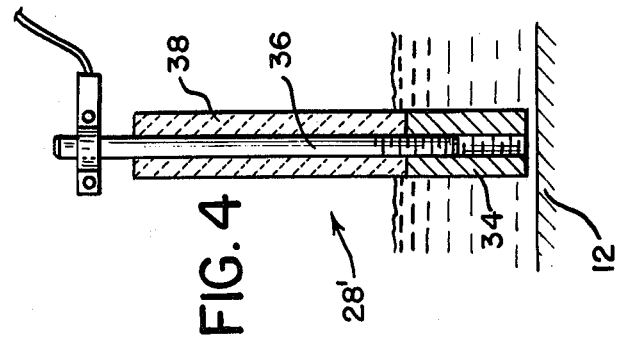
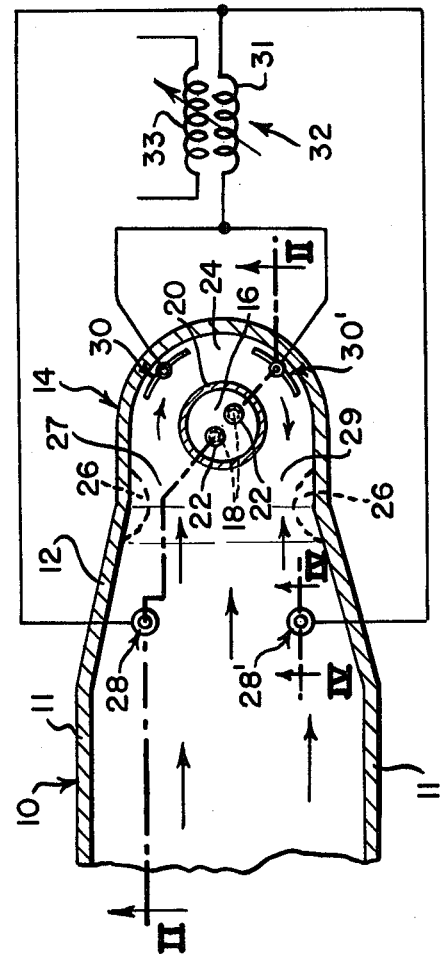
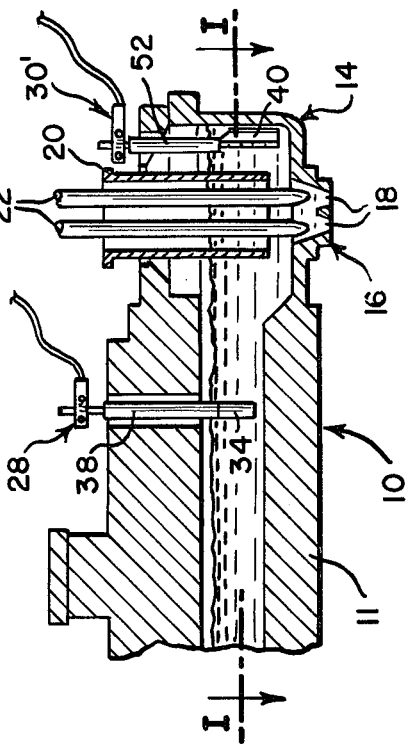

4,097,259

FEEDER CONDUITS FOR A GLASS FURNACE WITH HEATING ELECTRODES

BACKGROUND OF THE INVENTION

1. Field of the Invention

This invention relates to improvements in the feeder conduits for a glass furnace.

2. Description of the Prior Art

In manufacturing glass articles such as bottles, molten glass is conveyed from a glass furnace to a forehearth. The molten glass is delivered from the forehearth to several glass distribution conduits known as feeder conduits or "feeders". When needed, discrete gobs of molten glass or parisons are discharged from the downstream portion of each feeder to forming machines which produce the desired glass article.

Usually, the feeder is an elongated conduit with its downstream portion terminating in a bowl-shaped container known as a bowl. The bottom of the bowl has openings for the discharge of the parisons. Molten glass flows from the forehearth, through the conduit, into the bowl, and out its openings. A rotatable vertical cylinder is located within the bowl above the openings. The cylinder is also movable along its axis from a low position to a high position. In its low position, the cylinder rests upon the bottom of the bowl to seal the openings and to prevent the molten glass from passing therethrough. In its high position, the molten glass is permitted to flow underneath the cylinder and through the openings. Plungers are movably positioned within the cylinder coaxial with the openings. When the cylinder is in its high position, the plungers assist in ejecting the molten glass through the openings from the bowl.

The rotatable cylinder and the side wall of the bowl define a semi-annular channel in which the rotation of the cylinder causes a rotational circulation of the molten glass within the channel. Upon entering the bowl, the molten glass from the elongated conduit flows into the molten glass emerging from the semi-annular channel. Because the glass from the semi-annular channel is traveling in a direction opposite that of the glass entering from the elongated conduit, the flow rate of the glass decreases in the region where these two streams meet and the glass may stagnate. The temperature of the glass consequently reduces and devitrified zones of semi-hardened glass coagulate on the side wall of the bowl.

Small fragments of the cooled material frequently detach from the wall of the bowl and pass with the parison through the bowl openings. As a result, the parison contains trailings of cold glass and does not have a uniform temperature. These thermal heterogeneities cause substantial variations in the physical and chemical properties of the pieces manufactured from such glass. For example, in the production of 600 g bottles, a variation in thickness of 0.2 to 1 mm has been detected, which makes it impossible for such bottles to meet their internal pressure specifications.

SUMMARY OF THE INVENTION

I have invented an improved feeder conduit which provides its forming machine with uniformly heated molten glass. The feeder conduit includes an elongated conduit having an inlet communicating with the forehearth to receive molten glass therefrom and an outlet. A bowl-shaped container has an inlet which communicates with the outlet of the elongated conduit to receive molten glass therefrom. The bottom of the container has an orifice for withdrawing the molten glass therefrom. A vertical cylinder is disposed within the container and above the orifice, and the cylinder and side wall of the container opposite the inlet of the container define a semi-annular channel therebetween. The cylinder is rotatable about its longitudinal axis for stirring the molten glass and producing a flow of glass through the semi-annular channel. A first electrode is inserted in the molten glass upstream of the cylinder and a second electrode is inserted in the molten glass within the semi-annular channel. Both electrodes substantially extend through the entire height of the molten glass. The first and second electrodes are offset from a vertical plane passing through the center of said elongated conduit and the center of said cylinder. The feeder conduit also includes means for energizing the first and second electrodes to produce an electric current flow through the molten glass between the electrodes to heat the molten glass flowing from said elongated conduit, past the cylinder and through the semi-annular channel.

In an embodiment of the present invention, the second electrode includes an arcuate plate member immersed in the molten glass and having a configuration corresponding to the configuration of the side wall of the container adjacent the second electrode. An electrode holder shaft is connected to said plate member and the plate member is energized through the holder shaft. A protective tube encircles the electrode holder shaft and rests upon the upper surface of the arcuate plate member.

BRIEF DESCRIPTION OF THE DRAWINGS

Preferred embodiments of the present invention are described below and illustrated in the drawings, wherein:

FIG. 1 is a plan view, partly in section of the downstream portion of a feeder conduit according to the invention;

FIG. 2 is a sectional view taken along line II—II of FIG. 1;

FIG. 3 is a circuit diagram of another embodiment of the present invention;

FIG. 4 is a sectional view taken along line IV—IV of FIG. 1; and

FIG. 5 is a perspective view of an arcuate electrode according to the present invention.

DETAILED DESCRIPTION OF THE PREFERRED EMBODIMENTS

FIGS. 1 and 2 illustrate the downstream portion of a feeder 10 having an elongated conduit 11 and a tapered channel 12, a semi-cylindrical bowl 14, and a cylinder 20 which are typical of the prior art, and electrodes 28, 28', 30 and 30' which are positioned and utilized in accordance with my invention. Channel 12 connects the main portion of feeder 10 to bowl 14 and tapers in the direction of the bowl. Channel 12 thereby serves as the inlet to bowl 14. The bottom of bowl 14 has an opening at its center which is covered by a discharge washer 16. To permit the discharge of parisons, discharge washer 16 has orifices 18 passing therethrough.

Vertical cylinder 20 is disposed above discharge washer 16 and is substantially coaxial with the side wall of bowl 14 and defines with the side wall opposite tapered channel 12 a semi-annular channel 24 therebetween. Cylinder 20 is rotated about its longitudinal axis by drive means (not shown). In addition to its rotational motion, cylinder 20 is movable along its axis between a high position (FIG. 2) which allows the molten glass contained in bowl 14 to flow through orifices 18, and a low position in which the lower end of cylinder 20 rests upon the bottom of bowl 14 and thereby prevents the molten glass from flowing through the orifices.

To assist in expelling the molten glass through orifices 18 when cylinder 20 is at its high position, plungers 22 are slidably positioned within cylinder 20 in line with orifices 18. The plungers move up and down to push the glass through the orifices.

Molten glass flows through feeder 10, past tapered channel 12 and into bowl 14. As tube 20 rotates clockwise, some of the molten glass enters portion 27 of bowl 14, passes through semi-annular channel 24 and encounters at 29 the molten glass passing along tapered channel 12. Prior to the present invention, the molten glass in the colliding streams stagnates and its temperature decreases. The cooled glass coagulates on the side walls of bowl 14 at 26 and forms lumps of devitrified material. As previously described, the cooled material would inadvantageously pass with the parisons to the forming machines.

To avoid this cooling, an auxiliary quantity of energy is supplied by the present invention to the molten glass in the downstream portion of feeder 10 via electrodes 28, 28' and 30, 30'. Illustratively, two electrodes 28 and 28' are placed in the molten glass at tapered channel 12, and two electrodes 30 and 30' are placed in the molten glass at semi-annular channel 24. Electrodes 28 and 30 are placed on one side of a vertical plane passing through the center of elongated conduit 11 and the center of the cylinder. Electrodes 28' and 30' are positioned on the other side of the plane. As shown in FIG. 1, electrodes 28 and 28' are connected in parallel to one terminal of a secondary coil 31 of a variable transformer 32 and electrodes 30 and 30' are connected in parallel to the other terminal. A primary coil 33 of transformer 32 is connected to a source of suitable voltage.

According to the present invention (FIG. 1), a voltage potential is applied across electrodes 28, 28' and 30, 30' to produce a current therebetween. The molten glass between the electrodes acts as a resistive medium for generating heat, and the temperature of the glass increases. The auxiliary energy advantageously prevents the glass from cooling and forming devitrified lumps of material at 26.

Referring to FIG. 3, there is shown another method according to the present invention for connecting the electrodes to a power source. Electrodes 28 and 30 are connected in parallel to one terminal of a power source U and electrodes 28' and 30' are connected in parallel to the other terminal of power source U. As in the case of the electrode connections of FIG. 1, this arrangement also can be used to raise the temperature of the molten glass.

Referring to FIG. 4, there is shown an enlarged view of electrode 28'. Illustratively, electrodes 28 and 28' are of the type described in U.S. application Ser. No. 772,023 filed Feb. 25, 1977, which is incorporated herein by reference. Each electrode comprises a cylindrical electrode proper 34 made of molybdenum which is screwed onto an electrode holder shaft 36 made of refractory steel. Shaft 36 is protected on the outside by a protective tube 38 which is made of refractory material.

Referring to FIG. 5, there is shown an enlarged perspective view of electrode 30'. Illustratively, electrodes 30 and 30' comprise an arcuate plate 40 immersed in molten glass and having a curvature similar to that of the side wall of bowl 14. Two semi-cylindrical rods 42 and 44 bracket plate 40 and are secured to the plate by rivets 46. One of the semi-cylindrical rods extends above plate 40 to form a threaded end part 48 which is screwed onto an electrode holder shaft 50 made of refractory steel. Shaft 50 is protected on the outside by a protective tube 52 made of refractory material. Tube 52 is shown in a raised position; but, in operation, its lower end rests upon the top of plate 40.

The auxiliary energy supplied by the electric current according to the present invention prevents the formation of zones of cold devitrified glass on the side wall of bowl 14. The parisons obtained by utilizing the present invention are free of cold glass trailings and the objects produced from the glass have more uniform physical characteristics, such as thickness.

More particularly, in the production of 600 g bottles, according to the present invention, an improvement of 2 to 4 bars has been observed in the resistance of the bottles to internal pressure. Further, in a feeder provided with two sets of electrodes and energized by 10 kw power, gas burner heating requirements are reduced by more than 45 therms per hour.

Finally, the use of electrodes 28, 28', 30, 30' makes it possible to save approximately one quarter hour per replacement of discharge washer 16. This is a substantial time savings because discharge washer 16 is subject to internal corrosion and must be changed frequently. More particularly, discharge washer 16 is changed by placing rotating tube 20 in its low position to stop the glass flow through orifices 18. The washer is then replaced and glass flow is resumed by lifting the rotating tube to its high position. As a result of the interruption in its flow, the molten glass in the bowl inadvantageously cools. Prior to the present invention, it was necessary to reheat the glass by intense gas heating before the parison could be ejected from the feeder. According to the present invention, the electrodes are energized with an increased voltage to prevent cooling of the glass as discharge washer 16 is replaced. The feeder therefore may be utilized sooner than previously possible.

While the invention has been described in conjunction with certain embodiments, it is understood that various modifications and changes may be made without departing from the spirit and scope of the invention. For example, electrodes 28 and 28' may be replaced by a single electrode and/or electrodes 30 and 30' may be replaced by another single electrode. Electrodes 28 and 28' or its single replacement electrode may be positioned before bowl 14 and offset from a vertical plane passing through the center of elongated channel 10 and the center of cylinder 20. Electrodes 30 and 30' or its replacement electrode need not be arcuately configured and may be positioned within semi-annular channel 24 and offset from the vertical plane.

I claim:

1. Apparatus for conveying molten glass from a forehearth to a glass forming machine comprising:
   a. an elongated conduit having an inlet connected to the forehearth for reception of molten glass therefrom;
   b. a bowl-shaped container having an inlet communicating with said elongated conduit for reception of molten glass therefrom, said container having in its bottom an orifice for withdrawing the molten glass therefrom;

c. a vertical cylinder disposed within the container and above the orifice, said cylinder and a side wall of the container opposite the inlet of the container defining a semi-annular channel therebetween, said cylinder being rotatable about its longitudinal axis for stirring the molten glass and effecting a flow of glass through said semi-annular channel;

d. a first electrode inserted in the molten glass upstream of said cylinder and substantially extending through the entire height of the molten glass;

e. a second electrode inserted in the molten glass within the semi-annular channel and substantially extending through the entire height of the molten glass, said first and second electrodes being offset from a vertical plane passing through the center of said elongated conduit and the center of said cylinder; and f. means for energizing said first and second electrodes to produce an electric current flow through the molten glass between said electrodes to heat the molten glass therebetween.

2. The apparatus according to claim 1 wherein the orifice and cylinder are positioned centrally within the container.

3. The apparatus according to claim 2 wherein said first electrode is inserted within the molten glass adjacent the inlet of the container.

4. The apparatus according to claim 3 wherein the inlet of the container is tapered from the elongated conduit toward the container.

5. The apparatus according to claim 4 wherein there are at least two second electrodes positioned on opposite sides of the vertical plane.

6. The apparatus according to claim 3 wherein there are at least two first electrodes which are positioned on opposite sides of the vertical plane.

7. The apparatus according to claim 6 wherein there are at least two second electrodes positioned on opposite sides of the vertical plane.

8. The apparatus according to claim 7 wherein said first electrodes are connected in parallel to a first terminal of said energizing means and the second electrodes are connected in parallel to a second terminal of said energizing means.

9. The apparatus according to claim 7 wherein said first and second electrodes positioned at the same side of the vertical plane are connected in parallel to a first terminal of said energizing means and the remaining electrodes are connected in parallel to a second terminal of said energizing means.

10. The apparatus according to claim 1 wherein said first electrode comprises:
   a. an electrode proper having an end immersed in the molten glass;
   b. an electrode holder shaft encircled by said electrode proper, said electrode proper being energized through said holder shaft; and
   c. a protective tube which encircles said electrode holder shaft and said electrode proper.

11. The apparatus according to claim 10 wherein said electrode proper is made of molybdenum.

12. The apparatus according to claim 1 wherein said second electrode has an arcuate configuration corresponding to the configuration of the side wall of the container adjacent said second electrode.

13. The apparatus according to claim 12 wherein said second electrode comprises:
   a. a plate member immersed in the molten glass and having a configuration corresponding to the configuration of the side wall of the container adjacent said second electrode;
   b. an electrode holder shaft connected to said plate member, said plate member being energized through said holder shaft; and
   c. a protective tube which encircles said electrode holder shaft and rests upon an upper edge of said arcuate plate member.

14. The apparatus according to claim 13 wherein said arcuate plate member of said second electrode is connected to its electrode shaft holder by two semi-cylindrical rods affixed to opposite surfaces of said arcuate electrode proper with one of said rods being threaded onto said electrode holder shaft.

15. The apparatus according to claim 13 wherein said plate member is made of molybdenum.

16. Apparatus for conveying molten glass from a forehearth to a glass forming machine comprising:
   a. an elongated conduit having an inlet connected to the forehearth for reception of molten glass therefrom;
   b. a bowl-shaped container having an inlet communicating with said elongated conduit for reception of molten glass therefrom, said container having a side wall configured as a cylinder and a bottom having at least one centrally disposed orifice for withdrawing molten glass from the container;
   c. a cylinder having its longitudinal axis disposed in a vertical plane within the center of the container and above the orifice, said cylinder and side wall of the container opposite the container inlet defining a semi-annular channel therebetween, said cylinder being rotatable about its longitudinal axis for stirring molten glass and producing a flow of glass through said channel;
   d. at least two first electrodes inserted in the molten glass at the inlet of the container and substantially extending through the entire height of the molten glass;
   e. at least two second electrodes inserted in the molten glass within the semi-annular channel and substantially extending through the entire height of the molten glass, one of each first and second electrode being positioned to one side of a vertical plane passing through the center of said elongated channel and the center of said cylinder, said other first and second electrode being positioned on the other side of the vertical plane;
   f. means for energizing said first and second electrodes to produce an electric current flow through the molten glass between said first and second electrodes to heat the molten glass therebetween.

17. The apparatus according to claim 16 wherein said first electrodes are connected in parallel to a terminal of said energizing means and the second electrodes are connected in parallel to another terminal of said energizing means.

18. The apparatus according to claim 16 wherein said first and second electrodes positioned at the same side of the vertical plane are connected in parallel to a terminal of said energizing means and the remaining electrodes are connected in parallel to another terminal of said energizing means.

19. The apparatus according to claim 16 wherein said first electrode comprises:
 a. an electrode proper having an end immersed in the molten glass;
 b. an electrode holder shaft encircled by said electrode proper, said electrode proper being energized through said holder shaft; and
 c. a protective tube which encircles said electrode holder shaft and said electrode proper.

20. The apparatus according to claim 16 wherein said second electrode comprises:
 a. a plate member immersed in the molten glass and having a radius of curvature corresponding to that of the side wall of the container adjacent said second electrode;
 b. an electrode holder shaft connected to said plate member, said plate member being energized through said holder shaft; and
 c. a protective tube which encircles said electrode holder shaft and rests upon an upper edge of said arcuate plate member.

* * * * *